United States Patent [19]

Chattha

[11] 4,215,204

[45] Jul. 29, 1980

[54] COATING COMPOSITIONS INCLUDING OLIGOMERIC HYDROXY PHOSPHATE CATALYST-D

[75] Inventor: Mohinder S. Chattha, Livonia, Mich.

[73] Assignee: Ford Motor Company, Dearborn, Mich.

[21] Appl. No.: 973,418

[22] Filed: Dec. 26, 1978

[51] Int. Cl.$^2$ ............... C08L 63/00; C08L 61/20
[52] U.S. Cl. ................... 525/161; 525/158;
525/913; 260/42.22; 260/42.28
[58] Field of Search ............ 260/834, 851, 854, 856;
525/158, 161, 162

[56] References Cited

U.S. PATENT DOCUMENTS

| | | | |
|---|---|---|---|
| 3,201,374 | 8/1965 | Simms | 260/854 |
| 3,532,655 | 10/1970 | Radlove | 260/854 |
| 3,773,710 | 11/1973 | Victorius | 260/856 |
| 3,790,513 | 2/1974 | Victorius | 260/856 |
| 3,846,368 | 11/1974 | Pettit | 260/856 |
| 3,865,904 | 2/1975 | Wingler | 260/856 |
| 3,959,554 | 5/1976 | Hick | 260/856 |
| 4,002,699 | 1/1977 | Labana | 260/854 |

*Primary Examiner*—Paul Lieberman
*Attorney, Agent, or Firm*—Roger L. May; Olin B. Johnson; Keith L. Zerschling

[57] ABSTRACT

An improved thermosetting coating composition of the type comprising a film forming component and an amino compound, wherein the composition cures by reaction between the amino compound and hydroxy functionality present on the film forming material. The improvement comprises including in the composition a catalyst comprising at least one oligomeric hydroxy functional organophosphate ester selected from certain mono- and diesters of phosphoric acid.

17 Claims, No Drawings

COATING COMPOSITIONS INCLUDING OLIGOMERIC HYDROXY PHOSPHATE CATALYST-D

BACKGROUND OF THE INVENTION

This invention relates to coating compositions of the type comprising a film forming component and an amino compound, wherein the composition cures by reaction between the amino compound and hyroxy functionality present on the film forming material. More particularly, the invention relates to thermosetting coating compositions of the aforementioned type wherein the composition includes a catalyst for the hydroxy/amino curing reaction comprising at least one oligomeric hydroxy functional organophosphate ester selected from certain mono- and diesters of phosphoric acid.

Thermosetting coating compositions which cure by reaction of hydroxy functionality with an amino compound are well known in the art. It is also well recognized in the art that it is desirable to catalyze the hydroxy/amino crosslinking reaction in order to attain a quicker and more complete cure of the coating composition. To this end, catalysts for this reaction have been developed and are also well known.

SUMMARY OF THE INVENTION

It has been discovered that thermosetting coating compositions of the aforementioned type wherein the crosslinking reaction consists essentially of a reaction between hydroxy functionality and an amino compound are significantly improved when catalyzed by a catalyst comprising at least one oligomeric hydroxy functional organophosphate ester having the formula:

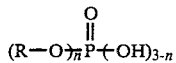

wherein $n=1$ to 2 and R is selected from the group consisting of mono- or dihydroxy radicals containing one or more ester linkages and having a molecular weight of between about 120 and about 1500. In particular, it has been found that such oligomeric hydroxy functional organophosphate ester catalyzed compositions exhibit rapid cure at low temperature and produce coatings with superior properties. In addition, the oligomeric hydroxy functional organophosphate ester catalyst does not become involved in deleterious side reactions as is the case with many conventional catalysts and has the further advantage of not leaching out of the coating composition after curing is completed.

More specifically, the catalyzed coating compositions of the invention include the broad class of thermosetting compositions wherein hydroxy functionality of the film forming component, which hydroxy functionality is either initially present, generated in situ, or both initially present, and generated in situ, is crosslinked with conventional amino functional crosslinking agents. As will be more fully described hereinafter, the hydroxy functionality which may be generated in situ may be generated in any manner known to the art with respect to this type of composition or it may be generated by a reaction between the catalyst itself and functionality in the film forming material, in particular, between the catalyst and epoxy functionality in the film forming material. In this case, the catalyst serves as a reactant which helps generate the hydroxy functionality subsequently engaged in the crosslinking reaction with the amino compound.

The invention will be more fully understood from the following detailed description of the invention and the examples.

DETAILED DESCRIPTION OF THE INVENTION

As discussed generally above, the coating compositions of the invention are thermosetting materials comprising a film forming material bearing hydroxy functionality which is formed by in situ reaction, an amino compound crosslinking agent, and the improved catalyst of the invention comprising at least one oligomeric hydroxy functional organophosphate ester selected from certain mono- and diesters of phosphoric acid. Each of the components of the coating compositions within the scope of the invention are described hereinafter in greater detail.

Organophosphate Ester

As mentioned above, the improvement in the invention resides in the use of a particular catalyst comprising at least one oligomeric hydroxy functional organophosphate ester. This novel oligomeric functional organophosphate ester is present in the composition as a mono- or diester of phosphoric acid or as a mixture of such mono- and diesters. The hydroxy functional organophosphate esters useful in the composition of the invention are those having the formula:

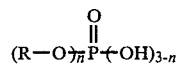

wherein $n=1$ to 2 and R is selected from the group consisting of mono- or dihydroxy radicals containing one or more ester linkages and having a molecular weight of between about 120 and about 1500.

A preferred method for preparing the oligomeric hydroxy functional organophosphate esters useful in compositions of the invention is by an esterification reaction between an excess of a di- or trihydroxy alkyl, cycloalkyl or aryl oligoester and phosphorus pentoxide. When a trihydroxy oligoester is used as a reactant, preferably at least one of the hydroxyl groups should be secondary. The reaction between the di- or trihydroxy oligoester and the phosphorus pentoxide is generally carried out by adding phosphorus pentoxide portionwise to an excess of the di- or trihydroxy oligoester in a liquid state or in solution in a suitable solvent. Suitable solvents include, but are not limited to, butyl acetate, methyl ethyl ketone, toluene, xylene, etc.

The hydroxy functional oligoesters useful in preparing the oligomeric hydroxy functional organophosphate esters used in the compositions of the invention have a molecular weight of between about 120 and about 1500. Such oligoesters may be prepared in accordance with numerous procedures recognized in the art. For example, the hydroxy functional oligoesters may be selected from the group consisting of: (i) dihydroxy oligoesters prepared by reacting a dicarboxylic acid with a monoepoxide, (ii) trihydroxy oligoesters prepared by reacting a monohydroxy dicarboxylic acid with a monoepoxide; (iii) dihydroxy oligoesters prepared by reacting a monocarboxylic acid with a diepoxide; (iv) trihydroxy oligoesters prepared by reacting a monocarboxylic acid with a monohydroxy diepoxide; (v) dihydroxy oligoesters prepared by reacting a monohydroxy monocarboxylic acid with a monoepoxide; (vi) trihydroxy oligoesters prepared by reacting a monohydroxycarboxylic acid with a monohydroxy monoepoxide; (viii) trihydroxy oligoesters prepared by reacting a monocarboxylic acid with a dihydroxy monoepoxide; (ix) dihydroxy oligoesters prepared by reacting a monocarboxylic acid with a monohydroxy monoepoxide; and (x) di- or trihydroxy oligoesters prepared by reacting polycaprolactones with diols or triols.

Dihydroxyoligoesters prepared by reacting a dicarboxylic acid with a monoepoxide and designated by (i) above are well known in the art. The most common of this group is a low molecular weight adduct of an aliphatic, cycloaliphatic or aryl dicarboxylic acid and a monoepoxide. Most commonly used monoepoxides are alkylene oxides such as ethylene oxide or propylene oxide. Among the numerous dicarboxylic acids which may be used are malonic acid, succinic acid, glutaric acid, 1,9 nonanedioic acid, 1,4-cyclohexanedicarboxylic acid, terephthalic acid, etc. Preferred dicarboxylic acids are $C_6$–$C_{12}$ aliphatic acids as well as mixtures of these acids or mixtures of the aliphatic dicarboxylic acids with cycloaliphatic or aromatic dicarboxylic acids. The above described adducts, which are prepared by reacting the acid and epoxide in the presence of a catalyst, have a narrow molecular weight distribution when compared to similar compositions made by normal polyester manufacturing techniques. While the specific reactants enumerated above will result in compounds containing two (2) ester groups, it will be appreciated that additional ester linkages may be present in the compound as a result of being included as a part of a radical born by either the monoepoxide or the dicarboxylic acid. For example, an oligoester bearing more than two ester linkages may be prepared by reacting dicarboxylic acid with a glycidyl carboxylate monoepoxide. This reaction results in a dihydroxy oligoester bearing four (4) ester linkages. Of course, various other combinations of dibasic acids and monoepoxides will be apparent to the skilled artisan.

In preparing the trihydroxy oligoesters designated as (ii) above, numerous monohydroxy dicarboxylic acids may be employed in lieu of the dicarboxylic acids previously described. Representative of these monohydroxy aliphatic, cycloaliphatic or aromatic dicarboxylic acids are malic acid, hydroxyglutaric acid, 2-hydroxy-1,4-cyclohexanedicarboxylic acid and 2-methylol terephthalic acid. As with oligoesters designated by (i) above, the preferred monohydroxydicarboxylic acids are $C_6$–$C_{12}$ aliphatic acids, mixtures of those acids or mixtures of those acids with cycloaliphatic or aromatic dicarboxylic acids.

In preparing dihydroxy oligoesters designated as (iii) above, a monocarboxylic acid is reacted with a diepoxide. Representative of the numerous aliphatic, cycloaliphatic or aromatic monocarboxylic acids which may be used are pentanoic acid, hexanoic acid, heptanoic acid, cyclohexane carboxylic acid and benzoic acid. Preferred monocarboxylic acids are acetic acid, propionic acid and butyric acid. Among the numerous suitable diepoxides which will be apparent to those skilled in the art are: cycloaliphatic diepoxides and glycidyl ethers of aliphatic and aromatic dihydroxy compounds. As was the case above, polyester linkages other than those resulting from the esterification reaction between the acid and epoxy groups may be included by using acids or diepoxides containing a radical bearing one or more ester linkages. For example, acetic acid could be reacted with bis-(3,4-epoxy-6-methylcyclohexylmethyl) adipate to yield an oligoester with four (4) ester linkages.

Trihydroxy oligoesters designated (iv) may be prepared by reacting monocarboxylic acids such as described in (iii) with monohydroxy diepoxides. Typical monohydroxy diepoxides are: hydroxyglycidyl ethers of bisphenol A and aliphatic hydroxyglycidyl resins. As above, radicals bearing additional ester linkages may be included in the acid or diepoxide.

Dihydroxy oligoesters designated as (v) above may be prepared by reacting a monohydroxy monocarboxylic acid with a monoepoxide. Representative of the numerous aliphatic, cycloaliphatic or aromatic monohydroxy monocarboxylic acids are 3-hydroxybutyric acid, 4-hydroxycyclohexylcarboxylic acid and 4-methylol benzoic acid.

Suitable monoepoxides are enumerated above in the discussion of oligoesters (i) and (ii). As in all cases, radicals bearing additional ester linkages may be included.

The trihydroxy oligoester of (vi) is a variation of (v) with the reactants being a monoepoxide as above and a dihydroxymonocarboxylic acid, such as 3,4-trihydroxybutyric acid and glyciric acid.

The trihydroxy oligoester of (vii) is prepared by reacting a monohydroxy monocarboxylic acid such as in (v) above with a monohydroxy monoepoxide such as, for example, glycidol and 1,4-butanediolmonoglycidyl ether. As in other cases, additional ester linkages may also be included in the oligoester.

The trihydroxy oligoester designated (viii) may be prepared by reacting a monocarboxylic acid as above with a dihydroxy monoepoxide such as acetic acid with 2,3-epoxy-1,4-butane diol. Additional ester linkages may be included, if desired.

The dihydroxy oligoester (ix) is prepared by reacting a monocarboxylic acid with a monohydroxy monoepoxide. Both reactants are discussed above and, as in other cases, additional ester linkages may be added using ester bearing radicals.

Hydroxyfunctional oligoesters of the type designated by (x) above are known in the art. Polycaprolactones, such as ε-caprolactone, reacted with diols yield dihydroxy oligoesters while reaction with triols yields trihydroxy oligoesters.

A preferred temperature for carrying out the reaction between the hydroxy functional oligoester and the phosphorus pentoxide is between about 50° C. and about 55° C. Due to the multiple hydroxy functionality of the di- or trihydroxy oligoester, minor amounts of polymeric acid phosphate as well as certain cyclophosphates are also generated during the synthesis. These polymeric and cyclic materials also serve as a reactive catalyst and, therefore, need not be separated from the hydroxyphosphate esters described above. In fact, it has been found advantageous in preferred embodiments of the invention to employ all reaction products, i.e., the hydroxy functional organophosphate esters and the minor amount of polymeric acid phosphate cyclophosphates, as well as excess di- or trihydroxy oligoester in the coating compositions. The excess di- or tirhydroxy oligoester serves in those compositions as the optional hydroxy functional additive. Reactive catalysts prepared by the above preferred method will generally include about a 1 to 1 ratio of the mono- and diester organophosphate.

The oligomeric hydroxy functional organophosphate ester component of the thermosetting coating composition of the invention is a reactive catalyst which allows the composition to cure rapidly at a low temperature. In all cases, the hydroxy functionality present on the oligomeric hydroxy functional organophosphate ester engages in the crosslinking reaction by reacting with the amino compound in addition to catalyzing the reaction between the amino compound and the hydroxy functionality present in the film forming materials. It is this reaction of the hydroxy functionality of the oligomeric hydroxy functional organophosphate ester which probably accounts for the fact that the catalyst does not leach out of the finally cured composition. Thus, the catalyst serves not only to catalyze the reaction between the film forming material and the crosslinking agent, but also to more completely tie up the matrix of the composition and provide a more completely integrated crosslinked composition. In those embodiments of the invention wherein the film forming material also includes an epoxy material, either on the same compound as the hydroxy functionality or on a separate compound forming a part of the film forming material, the oligomeric hydroxy functional organophosphate ester catalyst of the invention serves as a reactive catalyst in another sense. In this case, the acid functionality of the mono- or diester or mixture of such esters reacts with the epoxy functionality of the film forming material to form an ester and a hydroxyl group. This hydroxyl group, as will as the organic hydroxyl groups on the oligomeric hydroxy functional organophosphate ester and the other hydroxy functionality which may be present in the film forming material is available for crosslinking with the amino crosslinking agent.

The amount of the oligomeric hydroxy functional organophosphate catalyst which is included in the compositions of the invention will vary depending upon the nature of the film forming material employed and is a matter of choice which will be made by one skilled in the art.

Film Forming Material

As discussed above, film forming materials which either include hydroxy functionality initially, generate hydroxy functionality as a result of in situ reactions during the coating process or both include hydroxy functionality initially and generate it in situ, are well known to those skilled in the art. Selection of those materials will be a matter of choice and it will be recognized that the oligomeric hydroxy functional organophosphate catalyst is equally applicable to all such hydroxy bearing film forming materials crosslinked with amino compound.

While it is intended that all such hydroxy bearing film forming materials be included within the scope of the invention, several of these materials will be discussed below in greater detail for purposes of exemplification.

As discussed above, the film forming material may consist essentially of a compound which bears hydroxy functionality prior to initiation of the curing reaction. In most coating compositions, such materials should have a number average molecular weight ($\overline{M}_n$) of at least 150. A preferred type of hydroxy functional material which meets these limitations consists essentially of a copolymer bearing pendent hydroxy functionality. One class of such materials has a number average molecular weight ($\overline{M}_n$) of between about 1000 and about 20,000 and a glass transition temperature (Tg) of between about $-25°$ C. and about $70°$ C. Such a copolymer may, for example, consist of between about 5 and about 30 weight percent of monoethylenically unsaturated monomers bearing hydroxy functionality and between about 95 and about 70 weight percent of other monoethylenically unsaturated monomers.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha-beta olefinically unsaturated monomers which may be employed in such copolymers are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

As mentioned above, the film forming material may contain both hydroxy functionality and a material which reacts in situ to form hydroxy functionality. Exemplary of one such film forming material would be a material which consists essentially of a single copolymer bearing both hydroxy and epoxy functionality, the epoxy functionality reacting with the acid functionality of the hydroxy functional organophosphate ester as discussed above to form hydroxy functionality which thereafter may also react with the amino crosslinking agent. Such a difunctional copolymer may be of the acrylic type similar to the hydroxy functional copolymer discussed above. A preferred bifunctional copolymer of this type has a number average molecular weight ($\overline{M}_n$) of between about 1500 and about 10,000 and a glass transition temperature (Tg) of between about $-25°$ C. and about $70°$ C. Such a copolymer preferably is formed from between about 5 and 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than 30 weight percent of the monomers in the copolymer. The remainder of the monomers in the copolymer, i.e., between about 90 and about 70 weight percent, consist of other monoethylenically unsaturated monomers, such as those described above.

Also as mentioned above, the film forming material may consist essentially of a compound which reacts in situ to form hydroxy functionality, i.e., a compound not initially including hydroxy functionality. Such a compound could be, for example, a copolymer such as those described above, but bearing only glycidyl functionality. Such a copolymer bearing pendent functionality would have a number average molecular weight ($\overline{M}_n$) of between about 1500 and about 10,000 in a glass transition temperature (Tg) of between about $-25°$ C. and about $70°$ C. A preferred copolymer of this type consists of between about 10 and about 30 weight percent of monoethylenically unsaturated monomers bearing glycidyl functionality and between about 90 and about 70 weight percent of other monoethylenically unsaturated monomers, as discussed above.

Still another compound bearing epoxy functionality which may be employed when solely epoxy functionality, which in turn will react with the acid functionality of the organophosphate ester to form hydroxy functionality, is desired is a polyepoxide resin having a number average molecular weight of between about 140 and about 3000. Such polyepoxide resins could be selected from aliphatic, cycloaliphatic and aromatic polyepoxides falling within the stated molecular weight range. Such polyepoxides are well known compositions and any of these may be employed. Among the many suitable types of polyepoxides are those disclosed by U.S. Pat. Nos. 3,404,018; 2,528,359; 2,528,360; 3,198,850; 3,960,979; and 4,018,848.

As also mentioned above, there may be those instances when the film forming material desirably comprises separate compounds, one or more bearing hydroxy functionality and one or more others bearing functionality which reacts in situ to form hydroxy functionality. Such film forming materials might, for example, consist of the above noted hydroxy functional copolymer combined with the epoxy functional copolymer discussed above or the polyepoxide resin discussed above. Various other combinations of materials, of course, will be apparent to those skilled in the art. Still other film forming materials are exemplified in the detailed examples set forth hereinafter.

Amino Crosslinking Agent

Amino crosslinking agent suitable for crosslinking hydroxy functional bearing materials are well known in the art and their selection will be obvious to those skilled in the art. Typically, the crosslinking materials are products of reactions of melamine or urea with formaldehyde and various alcohols containing up to and including 4 carbon atoms. Among the numerous materials which may be employed are the amine aldehyde resins such as condensation products of formaldehyde with melamine, substituted melamine, urea, benozguanamine or substituted benzoguanamine. Preferred members of this class are methylated melamine-formaldehyde resins such as hexamethyoxymethyl-melamine. These liquid crosslinking agents have substantially one hundred percent (100%) nonvolatile content as measured by the foil method at 45° C. for 45 minutes. Some particularly well known crosslinking agents are the amino resins sold by American Cyanamid under the trademark "Cymel". In particular, Cymel 301, Cymel 303, and Cymel 1156, which are alkylated melamine-formaldehyde resins are useful in compositions falling within the scope of this invention.

Of course, the amount of crosslinking agent employed in any given composition is a matter of choice depending upon the final properties desired and the nature of the other materials in the coating composition.

Other Materials

Of course, it should be recognized that coating compositions within the scope of this invention may include other conventional components. These include, but are not limited to, antioxidants, U.V. absorbers, solvents, surface modifiers, wetting agents, pigments, fillers, etc.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

(a) 941 grams of azelaic acid are heated to melt in a three-necked flask equipped with a stirring rod, dropping funnel and a condenser. Sixteen grams of Cordova Accelerator (AMC-2) are added to the above melt and 725 grams of propylene oxide are added dropwise with continuous stirring; ice-cold water is continuously circulated through the condenser. After the addition is complete, the reaction mixture is heated for half an hour and then a slight vaccum is applied to remove any excess of propylene oxide.

Five hundered (500) grams of the above ester, bis-(hydroxypropyl) azelate, are placed under nitrogen in a threenecked flask and powdered phosphorus pentoxide is added to it with continuous stirring. An exothermic reaction occurs; the addition of $P_2O_5$ is regulated to maintain the temperature at $50°–55°$ C. The addition of $P_2O_5$ is continued until the acid equivalent weight of the reaction mixture has reached 430. The reaction mixture is allowed to stay overnight and is titrated with KOH next morning to obtain an acid equivalent weight of 398.

(b) A hydroxy acrylic copolymer is prepared from the following monomers:

|  | Wt/grams | Wt. % |
|---|---|---|
| Hydroxyethyl acrylate | 400 | 20 |
| Methylmethacrylate | 400 | 20 |
| Styrene | 200 | 10 |
| Butyl methacrylate | 1000 | 50 |

One hundred (100) grams tert-butyl perbenzoate is added to the above monomer mixture and the resulting solution added dropwise over a period of two hours to 1600 grams of refluxing (145°) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$, $\overline{M}_w/\overline{M}_n = 1.94$.

Calculated $T_g = 27°$ C.
Theoretical solids = 60%
Determined solids = 59.2%
Viscosity, #4 Ford Cup = 44 Sec.
Hydroxy equivalent weight = 980

One hundred fifty (150) parts of the above polymer solution and 40 parts of Cymel 301 (American Cyanamid) are dissolved in 30 parts of butyl acetate and fifteen (15) parts of hydroxyphosphate reaction product from (a) are added to it. The resulting formulation is spray applied to primed steel panels in three coats; the panels are baked at 130° C. for 20 minutes to obtain clear coatings with excellent hardness, adhesion and solvent (xylene and methyl ethyl ketone) resistance.

EXAMPLE 2

Preparation of hydroxypolymer described in Example 1(b) was repeated by employing only half the amount of the initiator. The molecular weight is determined by Gel Permeation Chromatography: $\overline{M}n = 5730$, $\overline{M}w/\overline{M}n = 2.1$.

Fifty-five (55) parts of this polymer solution, 25 parts of Cymel 301 (American Cyanamid) and 10 parts of bis-(hydroxypropyl) azelate are dissolved in 25 parts of butyl acetate and 8.5 parts of hydroxyphosphate reaction product from Example 1(a) are added to this solution. The resulting formulation is spray applied to primed steel panels which are baked at 130° C. for 20 minutes to obtain coatings with excellent hardness, adhesion and solvent resistance.

EXAMPLE 3

Ninety (90) parts of the polymer solution from Example 1(b) are mixed with 20 parts of bis-(3,4-epoxy-6-methycyclohexanemethyl) adipate (Araldite CY 178 from Ciba-Geigy) and 31 parts of hexamethoxymethyl melamine (Cymel 301, American Cyanamid). The above mixture is dissolved in 12 parts of cellosolve acetate and a solution of 37.9 parts of hydroxyphosphate reaction product from Example 1(a) in 15 parts of butyl acetate is added to it.

The resulting mixture is stirred for one minute and then spray applied to primed panels in three coats with an intermediate flash of one minute and a final flash of five minutes. The panels are baked at 130° C. for 20 minutes to obtain clear coatings with excellent hardness, adhesion and solvent (methyl ethyl ketone and xylene) resistance.

EXAMPLE 4

An acrylic copolymer is prepared from the following monomers:

|  | Parts by Weight |
|---|---|
| Butyl methacrylate | 26 |
| Ethylhexyl acrylate | 20 |
| Hydroxyethyl acrylate | 30 |
| Styrene | 24 |

The preparation is carried out in the same way as outlined in Example 1(b) by using cellusolve acetate as the solvent and tert-butyl peroctoate (5% of monomers) as initiator to obtain a 70% solution of the polymer. The calculated Tg is $-7°$ C. and the molecular weight from Gel Permeation Chromatography is $\overline{M}_n = 3070$ and $\overline{M}w/\overline{M}_n = 2.2$.

Twenty (20) parts of the above polymer solution are mixed with 12.5 parts of Araldite CY 178, 19 parts of Cymel 301 and five parts of butyl acetate. 23.7 parts of hydroxy phosphate reaction product, described in Example 1(a), are added to the above solution and the resulting formulation spray applied to primed steel panels. The panels are baked at 130° C. for 25 minutes to obtain a coating with excellent gloss, hardness, adhesion and solvent (xylene and methyl ethyl ketone) resistance.

EXAMPLE 5

Three hundred fifty (350) parts of TiO$_2$ are mixed with 350 parts of Acryloid OL-42 (Rohm & Haas Chem. Co.) and 25 parts of n-butyl acetate. The above mixture is taken up in a porcelain bottle containing porcelain beads and put on a roller mill for 16 hours. Thirty-one (31) parts of this mill base are mixed with 10 parts of hydroxy ester Desmophen KL5-2330 (Rohm & Haas Chem. Co.), 10 parts of 1,4-butanediol diglycidyl ether and 21 parts of Cymel 301. In a separate flask 5 parts of Desmophen KL5-2330 are mixed with 20.5 parts of hydroxy phosphate reaction product (Example 1(a)). The above two solutions are mixed together and the resulting formulation sprayed on primed panels in a four coat application with an intermediate flash of 1.25 minutes. After 5 minutes final flash the panels are baked at 130° C. for 20 minutes to obtain a coating with excellent xylene and methyl ethyl ketone resistance. The solids by weight are determined (130° C./30 min) to be 75%.

EXAMPLE 6

524 grams of bis-(hydroxypropyl) adipate are prepared from adipic acid and propylene oxide by following the method described for bis-(hydroxypropyl) azelate in Example 1(a). Hydroxyphosphate reaction product with acid equivalent weight of 315 is prepared from this dihydroxy ester as described in Example 1(a).

Fifty (50) parts of Phthalo Blue pigment are mixed with 500 parts of Acryloid OL-42 and 44 parts of n-butyl acetate and the mill base is ground as described in Example 5.

(a) Twenty-five (25) parts of the above mill base are mixed with 29 parts of Acryloid OL-42, 15 parts of 1,4-butanediol diglycidyl ether, 39 parts of Cymel 301, 5 parts of aluminum flakes (65% in naphtha) and 10 parts of n-butyl acetate.

(b) Twenty (20) parts of Acryloid OL-42 are mixed with 25.4 parts of the hydroxy phosphate reaction product, (eq. wt. 315) described above.

Components (a) and (b) are mixed and the resulting formulation sprayed on primed panels in three coats with one minute flash times between coats. After seven minutes final flash the panels are baked at 130° C. for 20 minutes to obtain blue metallic coatings with excellent hardness, adhesion, and solvent resistance.

EXAMPLE 7

In a round-bottom four-necked flask, equipped with a stirrer, a dropping funnel, a thermometer and a condenser, 500 ml of methyl and amyl ketone is brought to reflux under nitrogen. The following mixture of monomers is employed for polymer synthesis:

|  | Weight/Grams | Wt. % |
| --- | --- | --- |
| Butyl methacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

Thirty-seven (37) grams of tert-butyl perbenzoate is added to the above monomers and the resulting solution added dropwise to refluxing methyl amyl ketone over a period of one hour and ten minutes. The heating and stirring is continued for half an hour after the addition is complete and then two more grams, t-butyl perbenzoate are added portionwise. The reaction mixture is refluxed for two more hours and then allowed to cool to room temperature. The molecular weight of the copolymer is determined by Gel Permeation Chromatography and found to be $\overline{M}_n = 3250$ and $\overline{M}_w/\overline{M}_n = 2.2$. The calculated Tg of the polymer is 9° C. and the solution viscosity (#4 Ford cup) is 41 seconds.

Ninety (90) parts of the copolymer solution and 47 parts of Cymel 301 are dissolved in 20 parts of butyl acetate and 39.4 parts of the hydroxy phosphate reaction product from Example 1(a) are added to this solution. The resulting formulation is spray applied to steel test panels and the panels are baked at 130° C. for 20 minutes to obtain a coating with excellent hardness, adhesion and solvent (xylene and methyl ethyl ketone) resistance.

EXAMPLE 8

Five (5) parts of aluminum flakes (65% in naphtha) are mixed well with 80 parts of the copolymer solution from Example 7. Thirty-nine (39) parts Cymel 301 and 30 parts of butyl acetate are added to the above mixture and the resulting material is filtered through a coarse filtering cloth. 37.1 parts of hydroxy phosphate reaction product from Example 1(a) are added to the filtrate and the resulting formulation spray applied to primed steel test panels in a three coat application. The intermediate flash time is one minute and the final flash is five minutes. Th panels are baked at 130° C. for 20 minutes to obtain a silver metallic coating with excellent hardness, adhesion and solvent (xylene and methyl ethyl ketone) resistance.

EXAMPLE 9

The following monomers are utilized in the synthesis of a glycidyl methacrylate polymer.

|  | Wt. g | Wt. % |
| --- | --- | --- |
| Butyl methacrylate | 120 | 16 |
| Ethylhexyl acrylate | 142.5 | 19 |
| Glycidyl methacrylate | 195 | 26 |
| Methyl methacrylate | 255 | 34 |
| Styrene | 37.5 | 5 |

The polymerization is carried out as outlined in Example 7 by employing 500 grams of methyl amyl ketone and 30 grams of tert-butyl perbenzoate. The addition of initiator and the monomer mixture is complete in two hours and the reaction mixture refluxed for one additional hour. Two grams of initiator are then added and the reaction mixture refluxed for two hours. The molecular weight determined by Gel Permeation Chromatography is found to be $\overline{M}_n = 3168$ and $\overline{M}_w/\overline{M}_n = 2.15$. The Tg of this polymer is calculated to be 20° C.

Thirty-two (32) parts of the above polymer solution, fifteen (15) parts of hexamethoxymethyl melamine (Cymel 301) and two parts of 1,4-Cyclohexanedimethanol are dissolved in ten parts of butyl acetate. 14.6 parts of hydroxyphosphate reaction product from Example 1(a) are added to the above solution and the resulting formulation spray applied to primed steel panels; the panels are baked at 130° C. for 20 minutes to obtain a coating with excellent physical properties.

EXAMPLE 10

(a) By following the procedure described in Example 1(a), 586 grams of a mixture of bis-(hydroxypropyl) azelate and bis-(hydroxypropyl) terephthalate are prepared from 188 grams of azelaic acid and 166 grams of terephthalic acid. Hydroxyphosphate reaction product with acid equivalent weight of 337 is prepared from the above ester mixture as described in Example 1(a).

(b) The following mixture of monomers is used in the polymer synthesis:

|  | Wt. % |
| --- | --- |
| Butyl methacrylate | 25 |
| Glycidyl acrylate | 30 |
| Methyl methacrylate | 40 |
| Styrene | 5 |

The polymerization is carried out as outlined in Example 1 to obtain a 50% solution of the polymer.

Seventy (70) parts of the above polymer solution, 15 parts of bis-(hydroxypropyl) azelate from Example (1) and 45 parts of hexamethoxymethyl melamine (Cymel 301) are dissolved in 10 parts of butyl acetate. 24.9 parts of hydroxyphosphate reaction product from (a) are added to the above solution and the resulting formulation spray applied to primed steel panels. The panels are baked at 130° C. for 15 minutes to obtain coatings with excellent adhesion, hardness and solvent (xylene and methyl ethyl ketone) resistance.

EXAMPLE 11

In the composition described in Example 1, 45 parts of Cymel 1156 are substituted for Cymel 301 used therein. The resulting formulation is applied by spraying to primed steel panels which are baked at 130° C. for 15 minutes to obtain coatings with excellent adhesion, hardness and solvent (xylene and methyl ethyl ketone) resistance.

EXAMPLE 12

In the composition described in Example 10, 47 parts of alkoxymethylolbenzoguanamine (Cymel 1123) are substituted for Cymel 301 used therein. The resulting formulation is applied by spraying to primed steel panels which are baked at 130° C. for 15 minutes to obtain coatings with excellent adhesion, hardness and solvent (xylene and methyl ethyl ketone) resistance.

EXAMPLE 13

One hundred grams of carboxyterminated polybutadiene resin (HYCAR CTBN 1300X8) are mixed with 100 grams of aliphatic epoxy Araldite CY-178 and 25 ml n-butyl acetate. Two grams of Cordova Accelerator AMC-2 are dissolved in 25 ml n-butyl acetate and are added to the reaction mixture. The contents of the flask are stirred to obtain a nearly homogeneous mixture and the reaction mixture is stirred at 50° C. for 15 hours.

Three parts of the above mixture, seven parts of Araldite CY-178 and nine parts of Cymel 301 are dissolved in ten parts of n-butyl acetate. Thirteen parts of hydroxyphosphate reaction product from Example 1(a) are added to the above solution and the resulting formulation is spray applied on cold-rolled unpolished steel panels. The panels are baked at 145° C./30 minutes to obtain coatings with excellent hardness, adhesion and solvent resistance. A test panel is put in Cleveland Humidity Chamber for 17 days; very minimal loss of adhesion occurs.

EXAMPLE 14

In a three-necked, round bottom, two liter flask, equipped with a stirrer, a condenser and a dropping funnel, 750 ml of toluene is brought to reflux under nitrogen. The following mixture of monomers, containing 15 grams of 2,2'-azobis-(2-methyl propionitrile) dissolved in 50 ml acetone, is added dropwise to the refluxing toluene.

|  | Weight Gram | Wt. % |
|---|---|---|
| Butyl methacrylate | 150 | 50 |
| Glycidyl methacrylate | 45 | 15 |
| Hydroxypropyl methacrylate | 30 | 10 |
| Methyl methacrylate | 60 | 20 |
| Styrene | 15 | 5 |

The addition of the initiator and monomer solution is completed in three hours. The reaction mixture is refluxed for half an hour more and 10 ml of acetone solution of 2 grams of the above initiator is added dropwise and the reaction mixture refluxed for half an hour. Part of the solvent is distilled out to bring the solids content to 66% by weight.

Twenty (20) parts of this polymer solution are mixed with 9 parts of Cymel 301 and the mixture dissolved in ten (10) parts of butyl acetate. 6.6 parts of hydroxy phosphate reaction product from Example 1(a) is added to the above solution and the resulting formulation drawn on a steel test anel. The panel is baked at 125° C. for 20 minutes to obtain a coating with excellent hardness, adhesion and solvent (xylene and methyl ethyl ketone) resistance.

EXAMPLE 15

A copolymer is prepared by following the procedure described in Example 14 in methyl amyl ketone at 125° C. and by using the following monomers:

| Butyl methacrylate | 50 |
|---|---|
| Ethylhexyl acrylate | 10 |
| Glycidyl methacrylate | 15 |
| Hydroxypropyl methacrylate | 10 |
| Methyl methacrylate | 10 |
| Styrene | 5 |

Tert-butyl peroctoate (5.25% of monomers) is used as initiator and determined solids content is 56.6% by weight. The calculated Tg of the copolymer is 25° C. and the molecular weight from Gel Permeation Chromatography is found to be $\overline{M_n} = 4220$ and $\overline{M_w}/\overline{M_n} = 1.90$.

A millbase is prepared by dispensing titanium dioxide in the polymer (b) with a high speed Cowl's blade. The composition of the millbase is: 15% polymer (100% nonvolatile), 65% titanium dioxide and 20% methyl amyl ketone. Seventy-two (72) parts of this millbase, 31 parts of the polymer solution, 5 parts of bis-(hydroxypropyl) azelate, 29 parts of Cymel 301 and 21 parts of methyl amyl ketone are taken up in a plastic bottle. 9.5 parts of hydroxy phosphate (equivalent weight 315), described in 6, are added to the above mixture and the resulting formulation spray applied to both primed and unprimed steel panels. The panels are baked at 130° C. for 20 minutes to obtain hard, glossy coatings with excellent adhesion. The coating has an excellent solvent and humidity resistance.

EXAMPLE 16

By following the procedure described in Example 14, a copolymer is prepared from the following monomers:

|  | Weight Percent |
|---|---|
| Butyl methacrylate | 60 |
| Glycidyl methacrylate | 20 |
| Hydroxyethyl acrylate | 10 |
| Styrene | 10 |

The calculated Tg of the polymer is 25° C. and solids content is found to be 54.9% by weight. The molecule weight by Gel Permeation Chromatography is found to be $\overline{M_n} = 1809$ and $\overline{MW}/\overline{Mn} = 2.44$. As described in Example 15, a millbase is prepared from the following materials:

| Copolymer | 21% | (100% nonvolatile) |
|---|---|---|
| Titanium dioxide | 61% | |
| Methyl amyl ketone | 18% | |

Sixty-five (65) parts of this millbase, 27 parts polymer, 5 parts bis-(hydroxyl propyl) azelate, 25 parts Cymel 301 and 20 parts of methyl amyl ketone are taken up in a plastic bottle. Hydroxy phosphate reaction product from Example 1(a) (equivalent weight 398), 17.9 parts, is added to the above mixture and the resulting formulation spray applied to both primed and unprimed panels. The panels are baked at 130° C. for 20 minutes to obtain hard coatings with excellent adhesion and solvent resistance.

EXAMPLE 17

By following the procedure described in Example 14, a copolymer is prepared from the following monomers.

|  | Weight Percent |
| --- | --- |
| Butyl methacrylate | 49 |
| Glycidyl methacrylate | 20 |
| Hydroxypropyl methacrylate | 10 |
| Methyl methacrylate | 16 |
| Styrene | 5 |

The calculated Tg of the copolymer is 43° C. and solids content is found to be 52%. The molecular weight, by Gel Permeation Chromatography, is found to be $\overline{Mn}=2904$ and $\overline{Mw}/\overline{Mn}=2.31$.

One hundred parts of the above polymer solution are mixed with 5.5 parts of aluminum flakes (65% in naphtha), 31 parts of Cymel 301 and 10 parts of butyl acetate. Thirty parts of hydroxyphosphate reaction product from Example 1(a) are added to the above mixture and the resulting formulation is applied by spraying in three coats to primed panels. The panels are baked at 120° C. to obtain silver metallic coating with excellent hardness, adhesion and solvent (xylene and methyl ethyl ketone) resistance.

EXAMPLE 18

By following the procedure described in Example 14, a copolymer is prepared in refluxing methyl amyl ketone from the following monomers:

|  | Weight Percent |
| --- | --- |
| Glycidyl methacrylate | 20 |
| Hydroxyethyl acrylate | 10 |
| Butyl methacrylate | 60 |
| Styrene | 10 |

Two percent tert-butyl peroctoate is used as initiator; the solids content is found to be 53.6%. From Gel Permeation Chromatography the molecular weight of the polymer is found to be: $\overline{Mn}=2746$ and $\overline{Mw}/\overline{Mn}=2.33$.

As described in Example 15, a millbase is prepared with the following ingredients:

|  | Weight Percent | |
| --- | --- | --- |
| Titanium dioxide | 56 | |
| The above Polymer | 26 | (100% non-volatile |
| Methyl amyl ketone | 18 | |

Seventy-one (71) parts of this millbase, 15 parts polymer, 7 parts bis-(hydroxypropyl) azelate, 27 parts Cymel 301, 25 parts methyl amyl ketone and 16.4 parts hydroxyphosphate reaction product (equivalent weight 398) from Example 1(a) are mixed in a plastic container. This formulation is spray applied to primed test panels. The panels are baked at 130° C. for 20 minutes to obtain glossy, hard coatings with excellent solvent (xylene and methyl ethyl ketone) resistance. The coatings do not show any loss of gloss, adhesion or solvent resistance upon exposure in a Cleveland Humidity Chamber for 14 days.

EXAMPLE 19

By following the procedure described in Example 14, a copolymer is prepared in refluxing toluene from the following monomers:

|  | Weight Percent |
| --- | --- |
| Butyl methacrylate | 50 |
| Ethylhexyl acrylate | 20 |
| Glycidyl methacrylate | 15 |
| Hydroxypropyl methacrylate | 10 |
| Styrene | 5 |

One thousand grams of the total monomers and 700 ml toluene and 50 grams tert-butyl peroctoate are used. The calculated Tg of this polymer is 6° C. and solid content is found to be 59% by weight; a Gel Permeation Chromatogram shows its molecular weight to be: $\overline{Mn}=4337$ and $\overline{Mw}/\overline{Mn}=2.14$. Viscosity of this polymer solution is 1.33 Stokes.

Fifty parts of this polymer solution, 21 parts of Cymel 301, 10.55 parts of hydroxy phosphate reaction product from Example 10 are dissolved in 12 parts of n-butyl acetate. This formulation is spray applied in three coats to primed steel panels which are baked at 130° C. for 20 minutes to obtain coatings with excellent physical properties.

EXAMPLE 20

Hydroxyphosphate reaction product with acid equivalent weight of 648 is prepared by following the procedure described in Example 1(a). Sixty parts of the polymer solution from Example 2 are mixed with three parts of aluminum flakes (65% in naphtha), 17 parts of Cymel 301, 7.5 parts of the above hydroxyphosphate reaction product and 20 parts of n-butyl acetate. This formulation is spray applied to a primed steel panel in three coats and it is baked at 130° C./20 minutes to obtain a silver metallic coating with excellent hardness, adhesion and solvent (xylene and methyl ethyl ketone) resistance.

EXAMPLE 21

Two hundred grams of azelaic acid, 165 grams of 1,4-cyclohexanedicarboxylic acid and 100 grams of butyl acetate are placed in three-necked flask and treatment with 290 grams of propylene oxide is carried out as described in Example 1(a). The resulting ester solution is treated with $P_2O_5$ (Example 1) to obtain hydroxyphosphate solution with acid equivalent weight of 511.

Twenty (20) parts of the polymer solution from Example 3 are mixed with 18 parts of Araldite CY178, 38 parts of glycoluril resin (Cymel 1170) and 7 parts of butyl acetate. The hydroxyphosphate reaction product described above, 43.8 parts, is added to the above solution and the resulting formulation applied by spraying to primed steel test panels. The panels are baked at 130° C. for 20 minutes to obtain a coating with excellent hardness, adhesion and solvent (xylene and methyl ethyl ketone) resistance.

EXAMPLE 22

Five hundred grams of caprolactone based oligodiol (mol. wt. 530, PCP-0200, Union Carbide) is treated with $P_2O_5$, as described in Example 1(a), to obtain a hydroxyphosphate reaction product with acid equivalent weight of 762.

Twenty-five (25) parts of cycloaliphatic epoxy Araldite CY178 (Ciba-Geigy) and 63 parts of urea resin (Beetle 80) are dissolved in 25 parts of n-butyl acetate and 91 parts of the above hydroxyphosphate reaction product are added to this solution. The resulting formulation is applied by spraying in three coats to primed steel panels which are baked at 130° C. for 30 minutes to obtain coating with excellent hardness, adhesion and solvent (xylene and methyl ethyl ketone) resistance.

EXAMPLE 23

Two grams of Cordova Accelerator (AMC-2) is mixed with 155 grams of vinylcyclohexene dioxide and this mixture is added dropwise to 120 grams of refluxing acetic acid. After the addition is complete, the reaction mixture is stirred at 100° C. for one hour and then is allowed to cool to room temperature. The resulting ester is treated with $P_2O_5$, as described in Example 1(a), to obtain a hydroxyphosphate reaction product with acid equivalent weight of 336.

Seventy parts of the polymer solution from Example 2 and 27 parts of Cymel 301 are dissolved in 25 parts of n-butyl acetate. Four parts of the above hydroxyphosphate reaction product are added to the above solution and the resulting formulation is applied by spraying to primed steel panels. The panels are baked at 130° C. for 20 minutes to obtain hard, glossy coating with excellent adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

I claim:

1. In a thermosetting coating composition comprising a film forming component and an amine aldehyde crosslinking agent, which composition cures by reaction between said amine aldehyde crosslinking agent and hydroxy functionality present on said film forming material, the improvement comprising including in said composition a catalyst for said reaction comprising at least one oligomeric hydroxy functional organophosphate ester having the formula:

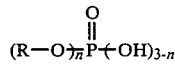

wherein n=1 to 2 and R is selected from the group consisting of mono- or dihydroxy radicals containing one or more ester linkages and having a molecular weight of between about 120 and about 1500.

2. A composition in accordance with claim 1 wherein said film forming material consists essentially of a compound bearing hydroxy functionality.

3. A composition in accordance with claim 2 wherein said film forming material has a number average molecular weight of at least 150.

4. A composition in accordance with claim 2 wherein said film forming material consists essentially of a copolymer bearing pendent hydroxy functionality, having a number average molecular weight ($\overline{M}_n$) of between about 1000 and about 20,000 and a glass transition temperature (Tg) of between about −25° C. and about 70° C., said copolymer consisting of between about 5 and about 30 weight percent of monoethylenically unsaturated monomers bearing hydroxy functionality and between about 95 and about 70 weight percent of other monoethylenically unsaturated monomers.

5. A coating composition in accordance with claim 1 wherein said film forming material consists essentially of a compound which reacts in situ during cure of said composition to form hydroxy functionality.

6. A coating composition in accordance with claim 5 wherein said reaction in situ forms substantially all of the crosslinking functionality in said film forming material.

7. A coating composition in accordance with claim 5 wherein said film forming material includes hydroxy functionality in addition to that which is formed by said reaction in situ.

8. A coating composition in accordance with claim 5 wherein said compound bears epoxy functionality which reacts with said oligomeric hydroxy functional organophosphate ester during cure of said composition to form hydroxy functionality which, in turn, reacts with said amino compound.

9. A coating composition in accordance with claim 1 wherein said film forming material consists essentially of a compound bearing both epoxy and hydroxy functionality.

10. A coating composition in accordance with claim 1 wherein said film forming material consists essentially of a mixture of a compound bearing hydroxy functionality and a compound bearing epoxy functionality.

11. A coating composition in accordance with claim 1 wherein said oligomeric hydroxy functional organophosphate esters are esters wherein R is a mono- or dihydroxy alkyl, cycloalkyl or aryl radical.

12. A coating composition in accordance with claim 1 wherein said oligomeric hydroxy functional organophosphate ester is a monoester.

13. A coating composition in accordance with claim 1 wherein said oligomeric hydroxy functional organophosphate ester is a diester.

14. A coating composition in accordance with claim 1 wherein said oligomeric hydroxy functional organophosphate ester is a mixture of mono- and diesters.

15. A coating composition in accordance with claim 14 wherein said oligomeric hydroxy functional organophosphate esters are esters wherein R is a mono- or dihydroxy alkyl, cycloalkyl or aryl radical.

16. A coating composition in accordance with claim 1 wherein said oligomeric hydroxy functional organophosphate ester is the reaction product of a di- or trihydroxy oligoester and phosphorus pentoxide.

17. A coating composition in accordance with claim 16 wherein said reactive catalyst including said oligomeric hydroxy functional organophosphate ester is the reaction product of an excess of a trihydroxy alkyl, cycloalkyl or aryl oligoester in which at least one of the hydroxy groups is secondary, and phosphorus pentoxide.

* * * * *